United States Patent [19]

Gulbins et al.

[11] Patent Number: 4,808,655
[45] Date of Patent: Feb. 28, 1989

[54] AQUEOUS BINDER DISPERSIONS FOR THE PREPARATION OF PAINTS AND FINISHES

[75] Inventors: Erich Gulbins, Heidelberg; Graham E. McKee, Weinheim; Gregor Ley, Wattenheim, all of Fed. Rep. of Germany

[73] Assignee: BASF Aktiengesellschaft, Ludwigshafen, Fed. Rep. of Germany

[21] Appl. No.: 90,450

[22] Filed: Aug. 28, 1987

[30] Foreign Application Priority Data

Aug. 30, 1986 [DE] Fed. Rep. of Germany ....... 3629581

[51] Int. Cl.$^4$ ............................................. C08L 51/00
[52] U.S. Cl. ..................................... 524/504; 524/510
[58] Field of Search ................................. 524/504, 510

[56] References Cited

U.S. PATENT DOCUMENTS

| | | | |
|---|---|---|---|
| 4,104,328 | 8/1978 | Swoboda et al. | 524/504 |
| 4,246,144 | 1/1981 | Girgis | 524/510 |
| 4,309,260 | 1/1982 | Bartz | 524/504 |
| 4,316,827 | 2/1982 | Pacala et al. | 524/510 |
| 4,355,131 | 10/1982 | Wise | 524/510 |
| 4,400,229 | 8/1983 | Demmer et al. | 524/510 |
| 4,476,277 | 10/1984 | Koyama et al. | 524/504 |
| 4,537,931 | 8/1985 | Gillberg-La Force et al. | 524/510 |
| 4,618,636 | 10/1986 | Muench et al. | 524/504 |
| 4,623,679 | 11/1986 | Gimpel et al. | 523/410 |

FOREIGN PATENT DOCUMENTS

| | | | |
|---|---|---|---|
| 0151053 | 11/1980 | Japan | 524/504 |
| 0907033 | 2/1982 | U.S.S.R. | 524/504 |
| 2119184 | 11/1983 | United Kingdom | |

*Primary Examiner*—Joseph L. Schofer
*Assistant Examiner*—J. M. Reddick
*Attorney, Agent, or Firm*—Keil & Weinkauf

[57] ABSTRACT

The present invention relates to aqueous binder dispersions for the preparation of, inter alia, paints and finishes, substantially containing (A) from 0.5 to 50% by weight of a phenolic resin precondensate, (B) from 20 to 70% by weight of a copolymer of predominant proportions of alkyl acrylates and/or methacrylates, minor proportions of comonomers with groups capable of crosslinking and other comonomers, the copolymer being in the form of a dispersion and being crosslinkable by a condensation reaction, and (C) from 10 to 70% by weight of a graft elastomer comprising a diene polymer as the base polymer and a copolymer of, substantially, styrene, acrylonitrile and $C_1$-$C_6$-alkyl acrylates and/or methacrylates, as the graft polymer, the graft elastomer being in the form of a dispersion, the percentages being based on the solids content of the total amount of (A), (B) and (C).

4 Claims, No Drawings

AQUEOUS BINDER DISPERSIONS FOR THE PREPARATION OF PAINTS AND FINISHES

The present invention relates to an aqueous binder dispersion for the preparation of, inter alia, paints and finishes, substantially containing.

(A) from 0.5 to 50% by weight of a phenolic resin precondensate, (B) from 20 to 70% by weight of a copolymer of predominant proportions of alkyl acrylates and/or methacrylates, minor proportions of comonomers with groups capable of crosslinking and other comonomers, the copolymer being in the form of a dispersion and being crosslinkable by a condensation reaction, and (C) from 10 to 70% by weight of a graft elastomer comprising a diene polymer as the base polymer and a copolymer of, substantially, styrene, acrylonitrile and $C_1$-$C_6$alkyl acrylates and/or methacrylates, as the graft polymer, the graft elastomer being in the form of a dispersion, the percentages being based on the solids content of the total amount of (A), (B) and (C).

Finishes based on a combination of aqueous dispersions and phenolic resins are known. Thus, German Laid-Open Application DE-OS No. 3,422,216 describes a process for the preparation of a binder based on a combination of an aqueous dispersion of a synthetic polymer and a water insoluble polycondensate of phenols and aldehydes and/or ketones, and the use of this binder for storagestable dispersion paints. Such dispersions are used as heat-curable finishes for metals and provide good protection against corrosion, good chemical resistance and good adhesion, but are insufficiently resistant to road chippings. This latter resistance is a measure of the wear characteristics of the finish.

It is an object of the present invention to provide finishes having improved resistance to road chippings.

We have found that this object is achieved by an aqueous binder dispersion for the preparation of, inter alia, paints and finishes, substantially containing (A) from 0.5 to 50% by weight of a phenolic resin precondensate, (B) from 20 to 70% by weight of a copolymer of predominant proportions of alkyl acrylates and/or methacrylates, minor proportions of comonomers with groups capable of crosslinking and other comonomers, the copolymer being in the form of a dispersion and being crosslinkable by a condensation reaction, and (C) from 10 to 70% by weight of a graft elastomer comprising a diene polymer as the base polymer and a copolymer of, substantially, styrene, acrylonitrile and $C_1$-$C_6$alkyl acrylates and/or methacrylates, as the graft polymer, the graft elastomer being in the form of a dispersion, the percentages being based on the solids content of the total amount of (A), (B) and (C).

The invention further relates to the use of this binder dispersion for the preparation of aqueous paints and finishes, and to aqueous paints and finishes which contain this dispersion.

Component (A) is a phenolic resin precondensate, namely a phenolic resin of low degree of condensation and possessing methylol and/or methylol ether groups.

To prepare component (A), a phenolic component is condensed with aldehydes, which may in part be replaced by ketones, using conventional condensation methods.

Examples of suitable phenolic components are phenol, alkyl-substituted phenols wherein alkyl is of 1 to 12 carbon atoms, e.g. octylphenol, nonylphenol and dodecylphenol, aryl-substituted phenols such as 2-hydroxybiphenyl, 4-hydroxy-biphenyl, bisphenols of the general formula

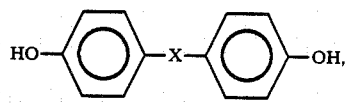

wherein X is (branched) alkyl of 1 to 12, preferably 3 to 7, carbon atoms, or is —$SO_2$—, especially bisphenol A (2,2-bis(4-hydroxyphenyl)-propane) and bisphenol S (4,4'-dihydroxydiphenylsulfone), or mixtures of these. Preferred phenolic components are bisphenol A and bisphenol S and especially mixtures of bisphenol A with bisphenol S, with alkyl-substituted phenols and/or with hydroxybiphenyl.

Suitable aldehydes, which may in part be replaced by ketones, are formaldehyde, acetaldehyde and their oligomers, acrolein and dialdehydes such as glutarodialdehyde, which may or may not be partially replaced by ketones, e.g. acetone. Preferred carbonyl components for the polycondensation are formaldehyde, paraformaldehyde and acetaldehyde.

The molar ratio of the phenolic component to the carbonyl groups of the aldehydes and/or ketones may be varied from about 0.33:1 to 1.25:1. Preferably, the ratio is from 0.4:1 to 0.67:1, and a ratio of about 0.5:1 is especially preferred.

Component (B) can be a copolymer dispersion wherein the copolymer contains glycidyl, carbonyl, N-methylol, N-alkoxymethyl, amino and/or hydrazo groups and, if desired, additionally contains carboxyl or hydroxyl groups. These functional groups can undergo condensation with the phenolic resin precondensate (A) or with a component used for the preparation of the precondensate.

The above functional groups in the copolymer are obtained in a conventional manner preferably by introducing, as copolymerized units, monomers which bear these functional groups.

The copolymer in general contains the above functional groups in amounts corresponding to 0.1-50, preferably 0.3-15, especially 0.5-10, % by weight, based on the copolymer, of copolymerized units of these monomers with functional groups.

Comonomers to be used with the monomers bearing the above functional groups are the conventional olefinically unsaturated monomers copolymerizable therewith, for example $C_1$-$C_{12}$-alkyl acrylates and methacrylates, preferably the $C_1$-$C_8$-alkyl esters, e.g. methyl acrylate, methyl methacrylate, ethyl acrylate, ethyl methacrylate, propyl acrylate, propyl methacrylate, butyl acrylate, butyl methacrylate, 2-ethylhexyl acrylate, 2-ethylhexyl methacrylate, lauryl acrylate and lauryl methacrylate; vinyl esters of $C_2$-$C_4$-carboxylic acids, e.g. vinyl acetate and vinyl propionate, $C_1$-$C_4$-dialkyl maleates and fumarates, and vinylaromatics, e.g. styrene, alpha-methylstyrene and vinyltoluene; acrylonitrile, methacrylonitrile, and, in small amounts, preferably of up to 5% by weight of the copolymer, acrylamide, methacrylamide, vinyl ethers of 3 to 10 carbon atoms and vinyl halides, e.g. vinyl chloride and vinylidene chloride; polyolefinically unsaturated compounds, e.g. butadiene and isoprene, and mixtures of the above monomers, provided they are copolymerizable with one another. Preferred comonomers are acrylates, methacrylates, acrylonitrile, methacrylonitrile, vinyl chloride, vinylidene chloride, styrene and butadiene.

The preparation of the graft elastomer dispersion (C) is described in, for example, German Published Specification DE-AS No. 2,427,960 or German Laid-Open Application DE-OS No. 3,313,919 and is carried out in two stages. In the first stage, the soft phase is prepared by homopolymerizing or copolymerizing butadiene, isoprene and higher alkyl acrylates and methacrylates. Preferably, soft phases having glass transition temperatures of from −80° to −20° C., especially from −70° to −30° C., are used. Such copolymers have a diene content corresponding to about 20–100% by weight of the total amount of all the monomers. Depending on the monomers used, the latex particles obtained in this stage may range from non-crosslinked to crosslinked.

The dispersion obtained in the first stage can either be further processed directly or be subjected to an agglomeration treatment before further use. In this agglomeration treatment, a second dispersion is added, the particles of which, because of their special structure, agglomerate with the particles of the elastomer latex and thus enlarge the latter. Such a process is described in, for example, Angewandte Makromolekulare Chemie, 2 (1968), 1–25.

The agglomeration is preferably carried out in the case of soft phase particles based on butadiene or isoprene comonomer, since the polymerization of these takes place markedly more rapidly in fine dispersion than in carse dispersions, and for the second stage of the emulsion polymerization the greater stability of the coarser dispersion is an advantage.

In the second stage, the dispersion from the first stage is grafted, by emulsion polymerization, with further monomers which form the graft shell. Preferred graft monomers are styrene, acrylonitrile, methyl acrylate, methyl methacrylate, ethyl acrylate, ethyl methacrylate, isopropyl acrylate, isopropyl methacrylate, n-butyl acrylate, n-butyl methacrylate, t-butyl acrylate, t-butyl methacrylate, ethylhexyl acrylate, ethylhexyl methacrylate, lauryl acrylate, lauryl methacrylate, t-butyl acrylate, t-butyl methacrylate, acrylic acid, methacrylic acid, vinyl acetate and vinyl methyl ether. Graft polymers with polar or reactive groups, the polymers accounting for from 0.1 to 50% by weight of the graft shell, are particularly preferred. Examples of suitable grafting monomers are hydroxyethyl acrylate, hydroxyethyl methacrylate, hydroxypropyl acrylate, hydroxypropyl methacrylate, butanediol monoacrylate, acrylic acid, methacrylic acid, maleic acid, itaconic acid, vinylsulfonic acid, acrylamidomethylpropanesulfonic acid, acrylamide, methacrylamide and its derivatives, especially N-methylolacrylamide, N-methylolmethacrylamide, t-butylaminoethyl acrylate, t-butylaminoethyl methacrylate, glycidyl acrylate, glycidyl methacrylate, acrylic acid and methacrylic acid.

The emulsion polymerizations to prepare components (B) and (C) may be carried out in the conventional manner, for example using initiators such as hydrogen peroxide, sodium or potassium persulfate, organic peroxides or conventional redox initiator systems, regulators such as mercaptans, emulsifiers/protective colloids, e.g. Na $C_{12}$–$C_{18}$paraffinsulfonate or salts of sulfuric acid half-esters of EO(PO) adducts (cf. Example 2) and other conventional assistants, so that further comments are unnecessary.

The binder dispersion can be prepared by forming the phenolic resin precondensate in dispersion (B), in dispersion (C) or in the mixture of dispersions (B) and (C).

For this purpose, the phenolic component is mixed with the particular dispersion or the mixture of the two dispersions, for example with stirring, preferably at 50°–150° C., if appropriate under pressure. The phenolic components may be added in solid or liquid form to the aqueous primary dispersion, and, if appropriate, the temperature at the time of addition may be lower than during the subsequent mixing-in.

The condensation of the phenolic component with the aldehyde (or ketone) to form the phenolic resin precondensate in the aqueous dispersion can be carried out at from room temperature to about 200° C., if appropriate under pressure, preferably at from 50° to 100° C., with or without addition of acid or basic catalysts such as inorganic or organic acids, ammonia or amines. Resins of the novolac or resol type are obtained, depending on the condensation conditions and the catalysts used. The ratio in which the copolymer and phenolic resin are mixed may range from 0.25:1 to 99:1, preferably from 1:1 to 4:1. The solids content of the dispersion may be from 10 to 70% by weight, preferably from 30 to 60% by weight.

The binder dispersions are preferably used to produce heat-curable metal finishes which have very good resistance to impact and deformation stress (and hence to road chippings). At the same time, the good properties of the finishes produced from these binders, such as good protection against corrosion, and good chemical resistance, are substantially preserved. Furthermore, the finishes show excellent adhesion to numerous plastics components, such as are increasingly employed in modern automotive construction, especially to nylons.

I. Preparation of a component (B)

32.1 g of fully demineralized water were initially introduced into a flask connected to two feed vessels.

Feed 1 was a mixture of 14.4 g of fully demineralized water, 2.14 g of a 35% strength by weight aqueous solution of a salt of a sulfuric acid half-ester of an adduct of about 25 moles of ethylene oxide with octylphenol, 17.55 g of n-butylacrylate, 10.35 g of styrene, 9.9 g of methyl methacrylate, 5.4 g of glycidyl methacrylate and 1.8 g of acrylic acid.

Feed vessel 2 contained a solution of 0.225 g of potassium peroxydisulfate in 6 g of water.

The flask was heated to 85° C., 5% of feed 2 was introduced and thereafter feed 1 and feed 2 were run continuously and simultaneously into the reactor over 2¼ hours. The temperature was kept at 85° C. for a further hour, after which the mixture was cooled.

A dispersion having a solids content of about 46% by weight, a pH of about 2.2 and an LD of about 50, corresponding to a mean particle diameter of about 250 nm, was obtained.

II. Preparation of a graft elastomer dispersion (C)

(a) Stage 1

A mixture of 423 g of butadiene, 564 g of fully demineralized water, 8.6 g of a 40% strength by weight aqueous solution of a sodium $C_{12}/C_{18}$-paraffinsulfonate, 1.33 g of potassium persulfate, 0.37 g of 25% strength by weight aqueous ammonia solution and 2.18 g of t-dodecylmercaptan was polymerized at 65° C. First, about 15% by weight of the butadiene was introduced, and the remainder was added over a period of 6 hours. After 10 hours' polymerization time, a further 2.18 g of t-dodecylmercaptan were added. After 22 hours, the mixture was allowed to cool and was filtered. The solids content of the dispersion was 42.7% by weight.

(b) Stage 2

296 g of the above dispersion were introduced into a kettle and 3.16 g of an aqueous solution of sodium $C_{12}/C_{18}$-paraffinsulfonate and 13.2 g of a 40% strength by weight aqueous ethyl acrylate/methacrylamide copolymer dispersion were added, resulting in an agglomeration of the latex particles.

After addition of 3.16 g of a 40% strength by weight aqueous solution of sodium $C_{12}/C_{18}$-paraffinsulfonate and 0.17 g of a 7% strength by weight aqueous solution of potassium persulfate, 53.1 g of n-butyl acrylate and 3.39 g of methacrylic acid were added over a period of 4 hours at 75° C. 2 hours after completion of the addition, the mixture was cooled to room temperature. The solids content of the dispersion was 50.5% by weight.

III. Preparation of a component (A) in a component (B)

200 g of the dispersion prepared according to I, 50 g of water, 25 g of bisphenol A and 25 g of octylphenol (technical grade) were introduced into a flask and heated to 90° C., with stirring. After the mixture had been stirred for 1½ hours at this temperature, 40 parts by weight of a 37% strength by weight aqueous formaldehyde solution were added and the batch was brought to pH 8.5 with about 30 g of concentrated aqueous ammonia. After a condensation period of 3 hours at 90° C., with stirring, the mixture was cooled.

A mobile dispersion having a solids content of about 43% by weight, a pH of 10.3 and an LD of about 32 was obtained.

IV. Preparation of a component (A) in a component (C)

1800 g of the graft elastomer dispersion prepared according to II, 300 g of fully demineralized water and 11 g of N,N-dimethylethanolamine were introduced into a flask. 100 g of bisphenol A were then added and the batch was heated and stirred at 90° C. for 1.5 hours. 80 g of a 37% strength by weight formaldehyde solution were then added, followed, after 1 hour, by 55 parts of dimethylethanolamine. The batch was kept at 90° C. for a further 4 hours. Upon cooling, a relatively mobile, coagulatefree dispersion having a solids content of about 44% by weight, a pH of about 10, an LD of about 17 and a mean particle size (determined in a Nanosizer) of 550 nm was obtained.

V. Preparation of a component (A) in a component (C)

1800 g of the dispersion prepared according to II, 500 g of fully demineralized water and 11 g of N,N-dimethylethanolamine were introduced into a flask. 500 g of bisphenol A were then added with stirring and the batch was heated and stirred at 90° C. for 1.5 hours. 80 g of a 37% strength by weight formaldehyde solution were then added followed, after 1 hour, by 55 g of dimethylethanolamine. The batch was kept at 90° C. for a further 4 hours. When it had cooled, a relatively mobile, coagulate-free dispersion having a solids content of about 44% by weight, a pH of 9.4 and an LD of about 8 was obtained.

COMPARATIVE EXAMPLE 740.3 g of the dispersion, containing phenolic resin, prepared according to III, 41.9 g of dipropylene glycol, 2.0 g of corrosion inhibitor 562 from Erbsloeh (Dusseldorf) (organic ammonium nitrite solution), 2.9 g of 2,4,7,9-tetramethyl-5-decine-4,7-diol (50% strength by weight in ethylene glycol), 1.4 g of the potassium salt of a phosphated alcohol (Strodex MOK 70, 70% strength by weight in water, Dekter Chem. Corp.), 13.9 g of the BASF thickener Collacral® PU 85, a polyurethane thickener (25% strength in water/butyl diglycol), 193.6 g of rutile titanium dioxide, 3.3 g of Light Blue 100 from Bayer, Leverkusen, and 0.7 g of carbon black (lamp black 101, pelletized, from Degussa), were milled for 72 hours in a ball mill, and the mixture was then filtered. The concentrate was brought to spraying viscosity (corresponding to about 18–20 seconds flow time in a DIN 4-cup with fully demineralized water and was applied to bright, degreased and solvent-clean steel sheet (UST 1405) and to commercial zinc phosphatized, after-treated and ovendried (bonderized) steel sheets. After baking for 30 minutes at 150° C. in a circulating air baking oven, the coating thickness and mechanical properties were determined (see Table).

EXAMPLE 1

In the finish formulation of the Comparative Example, the dispersion prepared according to III was replaced by the following dispersion according to the invention:

528.3 g of the dispersion prepared according to III, 211.9 g of a 48.1% strength by weight graft elastomer dispersion composed of 70% by weight of polybutadiene with a graft shell of 28.5% by weight of n-butyl acrylate and 1.5% by weight of glycidyl methacrylate, the dispersion being prepared according to III, and 0.1 g of triethanolamine (50% strength by weight in water) were mixed as follows: the elastomer dispersion was first neutralized with the triethanolamine and was then stirred into dispersion III at room temperature.

After compounding, binding and baking the finish, the mechanical properties shown in the Table were found.

EXAMPLE 2

In the finish formulation of the Comparative Example, the dispersion prepared according to III was replaced by the following dispersion according to the invention: 528.3 g of a dispersion prepared according to III 207.0 g of a 49.2% strength by weight graft elastomer dispersion composed of 70% by weight of polybutadiene with a graft shell of 28.2% by weight of n-butyl acrylate and 1.8% by weight of methacrylic acid, the graft elastomer dispersion being prepared according to III, and 5.0 g of triethanolamine (50% strength by weight in water).

After compounding, binding and baking the finish, the mechanical properties shown in the Table were found.

EXAMPLE 3

In the finish formulation of the Comparative Example, the dispersion prepared according to III was replaced by the following dispersion according to the invention: 527.89 g of a dispersion prepared according to III +211.60 g of a 50% strength by weight graft elastomer dispersion composed of 70% by weight of polybutadiene with a graft shell of 29.4% by weight of n-butyl acrylate and 0.6% by weight of methacrylic acid, the graft elastomer dispersion being prepared according to III, and 0.90 g of dimethylethanolamine.

After compounding, binding and baking the finish, the mechanical properties shown in the Table were found.

TABLE

| | Mechanical properties of the paint films | | | | | | | |
|---|---|---|---|---|---|---|---|---|
| | Comparative example | | Example 1 | | Example 2 | | Example 3 | |
| | Bright steel sheet | Zinc phosphatized steel sheet | Bright steel sheet | Zinc phosphatized steel sheet | Bright steel sheet | Zinc phosphatized steel sheet | Bright steel sheet | Zinc phosphatized steel sheet |
| Baking conditions | | | | ←30'/150° C.→ | | | | |
| Coating conditions [μm] | 38 | 38 | 35 | 35 | 35 | 34 | 42 | 35 |
| Erichsen pendulum damping (DIN 53 157) (swing) | 142 | 117 | 121 | 114 | 147 | 140 | 132 | 116 |
| Erichsen cupping [mm] (DIN 53 156) | 4.0 | 3.8 | 8.9 | 7.1 | 9.0 | 9.1 | 8.4 | 7.3 |
| Crosshatch (DIN 53 151) | 0-1 | 0-1 | 0 | 0 | 0 | 0 | 0 | 0 |

We claim:

1. An aqueous binder dispersion for the preparation of paints and finishes, the said binder consisting essentially of the following components:
   (A) from 0.5 to 50% by weight, based on the binder, of a phenolic resin precondensate;
   (B) from 20 to 70% by weight, based on the binder, of a copolymer containing
      ($b_1$) at least one comonomer selected from the group consisting alkyl acrylates and alkyl methacrylates as the predominant copolymerized unit(s), and
      ($b_2$) at least one comonomer selected from the group consisting of vinylesters of $C_2$–$C_4$ carboxylic acids, $C_1$–$C_4$-dialkylmaleates and fumarates, vinylaromatics, acrylonitrile, methacrylonitrile, acrylamide, methacrylamide, vinyl ethers of 3 to 10 carbon atoms, vinyl halides, and polyolefinically unsaturated compounds, as the additional copolymerized unit(s), said copolymer (B) containing from 0.1 to 50%, based on (B), of one or more functional groups selected from the group consisting of the glycidyl, carbonyl, N-methylol, N-alkoxymethyl, amino and hydrazo groups; and
   (C) from 10 to 70 by weight, based on the binder, of a graft elastomer consisting of diene polymer latex particles grafted with a copolymer containing at least one comonomer selected from the group consisting of styrene, acrylonitrile, $C_1$–$C_6$-alkylacrylates, and $C_1$–$C_6$-alkyl methacrylates, as the predominant copolymerized unit(s).

2. The aqueous binder dispersion of claim 1, wherein the copolymer (B) contains from 0.1 to 50% by weight of one or more functional groups selected from the group consisting of the glycidyl, carbonyl, N-methylol, N-alkoxymethyl, amino and hydrazo groups, and of one or more functional groups selected from the group consisting of carboxyl and hydroxyl groups.

3. An aqueous paint or finish, wherein the binder is an aqueous binder dispersion as claimed in claim 1.

4. An aqueous print or finish, wherein the binder is an aqueous binder dispersion as claimed in claim 2.

* * * * *